United States Patent
Servin et al.

(10) Patent No.: US 10,227,061 B2
(45) Date of Patent: Mar. 12, 2019

(54) CLOSING PLATE AND WINDSCREEN WIPER DRIVE MOTOR DEVICE FOR A MOTOR VEHICLE

(71) Applicant: Valeo Systèmes d'Essuyage, Le Mesnil Saint Denis (FR)

(72) Inventors: Alain Servin, Villiers (FR); Laurent Collinet, La Roche Posay (FR); Stephane Beauchamps, Bruxerolles (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 294 days.

(21) Appl. No.: 15/355,171

(22) Filed: Nov. 18, 2016

(65) Prior Publication Data
US 2017/0144632 A1    May 25, 2017

(30) Foreign Application Priority Data
Nov. 25, 2015 (FR) ...................... 15 61332

(51) Int. Cl.
*H02K 5/00* (2006.01)
*H02K 5/04* (2006.01)
(Continued)

(52) U.S. Cl.
CPC ............... *B60S 1/08* (2013.01); *B60S 1/166* (2013.01); *F16H 57/029* (2013.01);
(Continued)

(58) Field of Classification Search
CPC ... H02K 5/00; H02K 5/04; H02K 5/10; B60S 1/48
(Continued)

(56) References Cited

U.S. PATENT DOCUMENTS

| 6,431,026 B1* | 8/2002 | Walther | ............. B60S 1/16 |
| | | | 310/71 |
| 2009/0001829 A1* | 1/2009 | Uchimura | .......... H02K 5/148 |
| | | | 310/83 |

(Continued)

FOREIGN PATENT DOCUMENTS

| DE | 19609973 A1 | 9/1997 |
| DE | 102007058667 A1 | 6/2009 |

(Continued)

OTHER PUBLICATIONS

Preliminary Report Issued in Corresponding French Application No. 1561332, dated Aug. 8, 2016 (9 Pages).

*Primary Examiner* — Gary Nash
(74) *Attorney, Agent, or Firm* — Osha Liang LLP

(57) ABSTRACT

The invention relates to a closing plate (3) for a windscreen wiper drive motor device (1) for a motor vehicle, said device (1) being of the type comprising a support (2), a shaft (5) being received therein, said shaft bearing an endless screw (6) which is capable of being driven in rotation by a motor (7), and being of the type in which said support (2) comprises a bush mounting (17) for receiving a bush (18) which is capable of supporting one end (5a) of the shaft (5), said plate (3) comprising a base (14) which is capable of closing said support (2), the closing plate (3) being characterized in that it comprises a closing tongue (20) which is made of the same material as the base (14) and serves as a water deflector for an orifice (19) formed in the end of the bush mounting (17) in the axis of rotation of the shaft (5). The inventor further relates to a windscreen wiper drive motor device for a motor vehicle comprising a closing plate.

13 Claims, 3 Drawing Sheets

Figure 1:
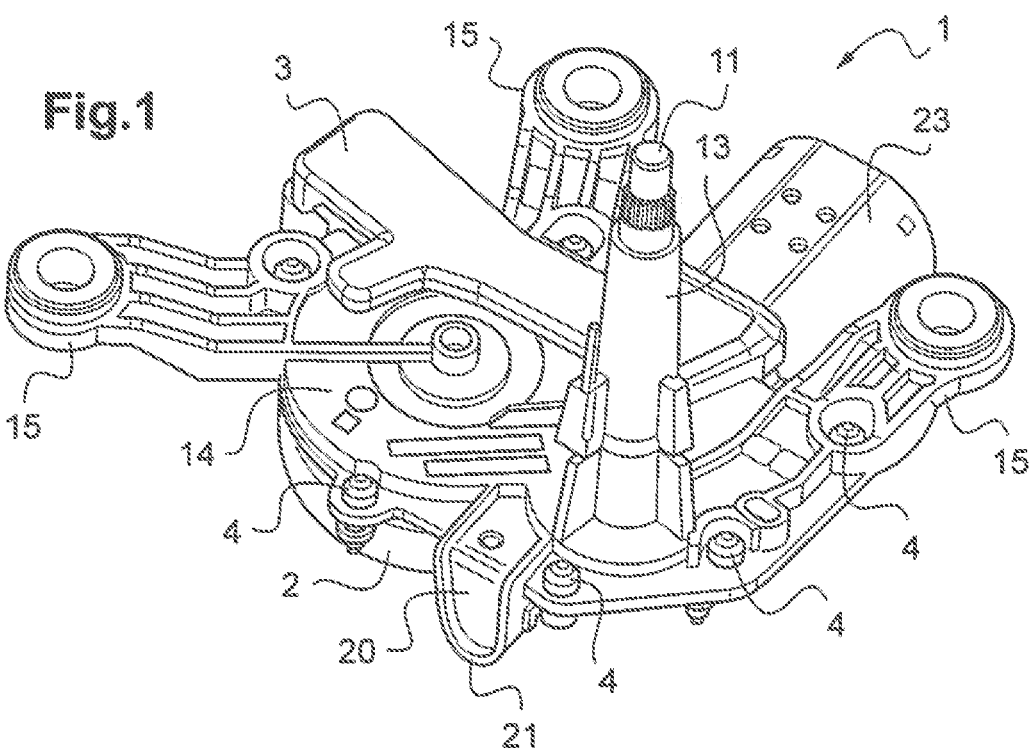

(51) Int. Cl.
*H02K 5/10* (2006.01)
*B60S 1/48* (2006.01)
*B60S 1/08* (2006.01)
*H02K 5/173* (2006.01)
*H02K 7/08* (2006.01)
*B60S 1/16* (2006.01)
*F16H 57/029* (2012.01)
*F16H 57/031* (2012.01)
*F16H 57/039* (2012.01)
*H02K 7/116* (2006.01)

(52) U.S. Cl.
CPC ......... *F16H 57/031* (2013.01); *F16H 57/039* (2013.01); *H02K 5/10* (2013.01); *H02K 5/173* (2013.01); *H02K 5/1732* (2013.01); *H02K 7/08* (2013.01); *H02K 7/081* (2013.01); *H02K 7/1166* (2013.01)

(58) Field of Classification Search
USPC ................................................ 310/87–89, 91
See application file for complete search history.

(56) References Cited

U.S. PATENT DOCUMENTS

| | | | | |
|---|---|---|---|---|
| 2009/0250933 | A1* | 10/2009 | Delf | F02B 41/10 290/52 |
| 2011/0089789 | A1* | 4/2011 | Tang | H02K 5/148 310/68 B |
| 2011/0133584 | A1* | 6/2011 | Uchimura | F16H 57/023 310/83 |
| 2013/0015739 | A1* | 1/2013 | Kastinger | H02K 7/081 310/83 |
| 2014/0250621 | A1* | 9/2014 | Tajima | H02K 5/10 15/250.31 |

FOREIGN PATENT DOCUMENTS

| | | |
|---|---|---|
| FR | 2973857 A1 | 10/2012 |
| JP | H09327167 A | 12/1997 |

\* cited by examiner

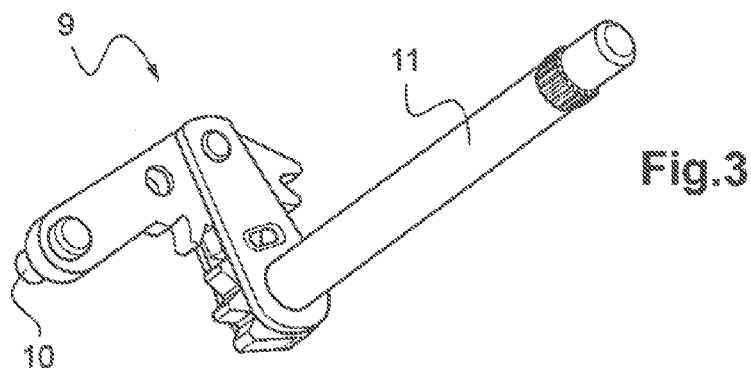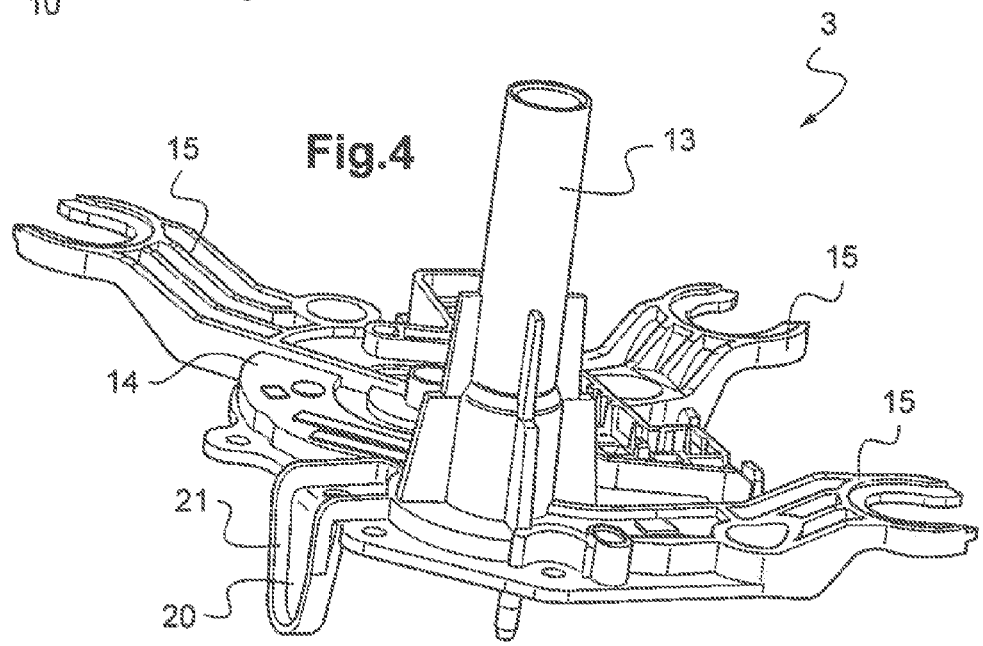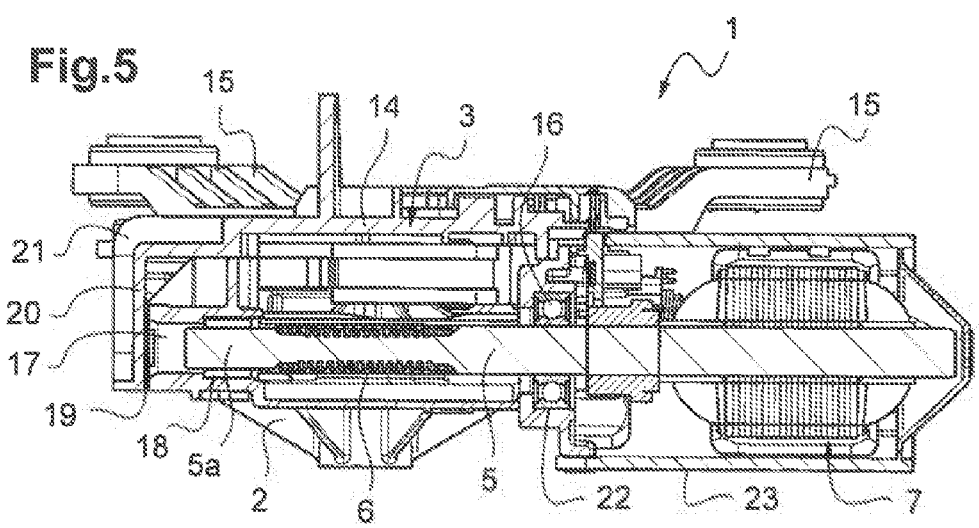

CLOSING PLATE AND WINDSCREEN WIPER DRIVE MOTOR DEVICE FOR A MOTOR VEHICLE

The invention relates to a closing plate for a windscreen wiper drive motor device for a motor vehicle. The invention further relates to a windscreen wiper drive motor device for a motor vehicle comprising a closing plate.

The windscreen wiper drive motor drives a shaft which bears an endless screw meshing with a toothed wheel driving a linkage member. These drive elements are received in a housing comprising a support which is closed by a closing plate, the plate having a hollow shaft which is designed to pass through the bodywork of the vehicle for the passage of the output shaft driving the windscreen wiper axis.

In the housing, the shaft comprising the endless screw is supported by two bearings, a first bearing receiving one end of the shaft and a second bearing arranged upstream of the motor. The first bearing comprises a bush inserted into a bush mounting formed in the support.

The bush mounting has a through hole. An orifice which is accessible from the outside of the housing permits the introduction of a tool for shaping the bush during the assembly of the elements for driving the motor module.

After the shaping of the bush, the external orifice is closed by a set screw which comes into abutment against the end of the shaft supported by the bush. The set screw permits the shaft to be retained and the clearance of the shaft to be regulated at least temporarily. This set screw also prevents any ingress of water inside the housing.

Recent developments have shown that the use of a rolling bearing in the region of the second bearing achieves a significant advantage.

This use makes the set screw superfluous since the shaft is then held in a sufficiently clamped manner by the rolling bearing.

Attempts are now being made to dispense with the mounting of the set screw in the support since it has become superfluous, but without leaving a hole in its place which could constitute an entry point for water originating, in particular, from leaks which are able to flow along the hollow shaft of the closing plate. The water could then penetrate the support, accumulate therein and stagnate, thus risking damage to the drive elements.

An object of the present invention, therefore, is to propose a closing plate and a motor device which at least partially remedy the drawbacks of the prior art and which are simple to implement and of low cost.

To this end, the subject of the present invention is a closing plate for a windscreen wiper drive motor device for a motor vehicle, said device being of the type comprising a support, a shaft being received therein, said shaft bearing an endless screw which is capable of being driven in rotation by a motor, and being of the type in which said support comprises a bush mounting for receiving a bush which is capable of supporting one end of the shaft, said plate comprising a base which is capable of closing said support, the closing plate being characterized in that it comprises a closing tongue which is made of the same material as the base and serves as a water deflector for an orifice formed in the end of the bush mounting in the axis of rotation of the shaft.

The closing tongue thus prevents the orifice of the bush mounting from constituting an entry point for water droplets originating, in particular, from flows along the hollow shaft of the closing plate.

The protection of the orifice by the closing plate is simple to implement since it is carried out at the same time as the closure of the support by positioning the closing plate. Thus creating and resorting to additional parts, such as a threaded closing screw and a machining of the support, such as thread tapping, are avoided, which simplifies the assembly method and limits the costs.

According to one or more features of the closing plate, taken individually or in combination:
  the closing tongue is capable of closing the orifice of the bush mounting,
  the closing tongue extends substantially perpendicular to the base,
  the closing tongue has a planar surface,
  the closing plate comprises at least one reinforcement which is at least partially borne by the closing tongue and which is made from the same material as the closing tongue,
  the reinforcement extends over the periphery of the closing tongue,
  the reinforcement also extends over the base,
  the closing tongue has a rounded end,
  the closing tongue has a filled U-shape,
  the closing plate is obtained by moulding.

The subject of the invention is also a windscreen wiper drive motor device for a motor vehicle, comprising a support, a shaft being received therein, said shaft bearing an endless screw which is capable of being driven in rotation by a motor of said device, the support comprising a bush mounting, a bush being received therein, said bush supporting one end of the shaft bearing the endless screw, an orifice being formed in the end of the bush mounting in the axis of rotation of the shaft, characterized in that the motor device comprises a closing plate, as disclosed above, said closing plate closing the support and serving as a water deflector for the orifice of the bush mounting.

According to one of more features of the motor device, taken individually or in combination:
  the motor device comprises a rolling bearing to support the shaft bearing the endless screw,
  the rolling bearing is arranged in a rolling bearing housing of the support, designed to be connected to a housing of the motor.

Figure 2:
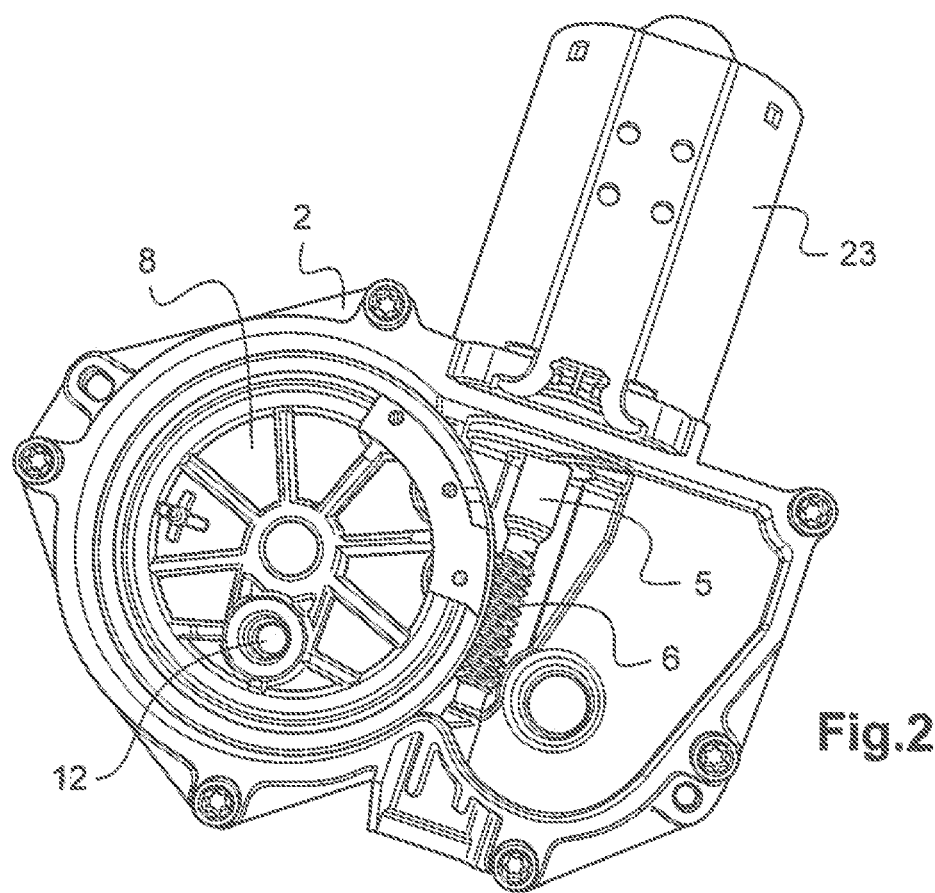
Figure 6:
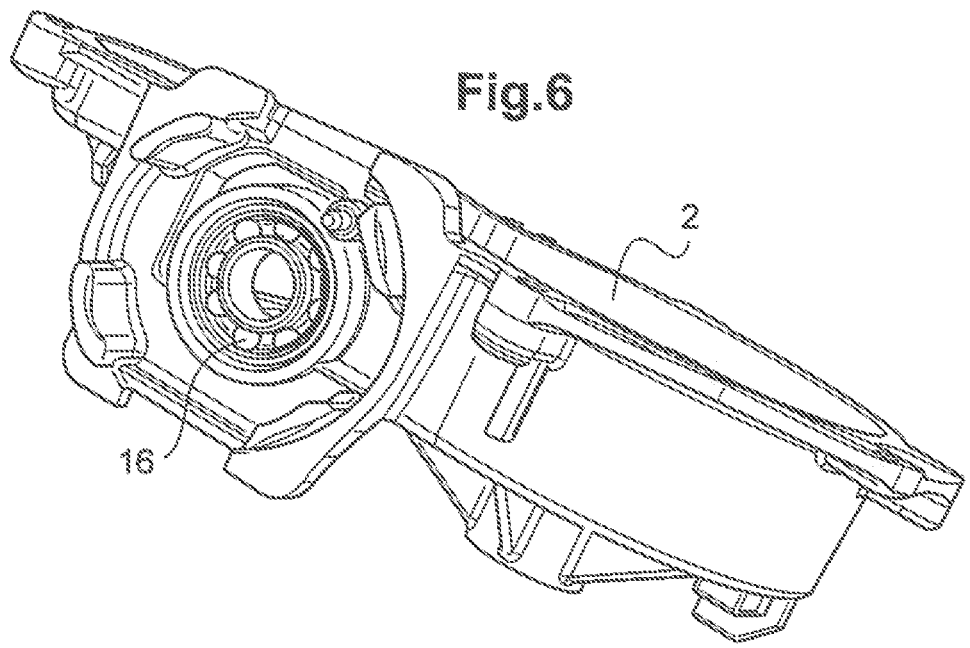
Figure 7:
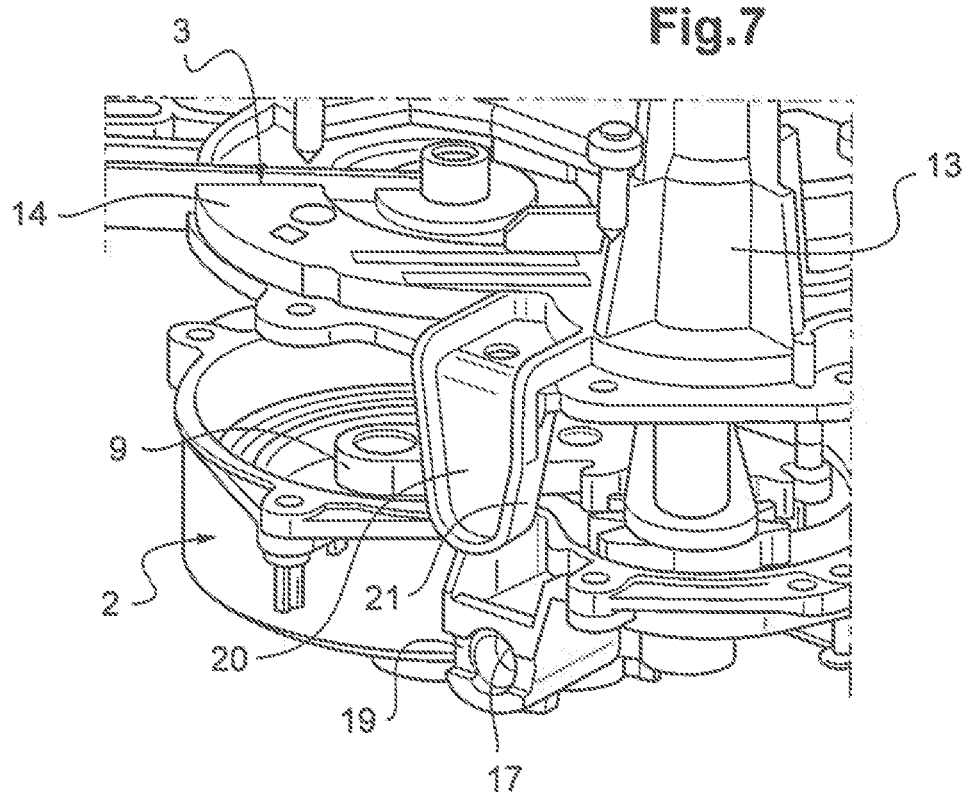

Further advantages and features will appear from reading the description of a non-limiting exemplary embodiment of the invention, as well as in the accompanying figures, in which:

FIG. 1 shows a schematic view of an assembly of a windscreen wiper drive motor device for a motor vehicle,
  FIG. 2 shows elements of the motor device of FIG. 1, viewed from above,
  FIG. 3 shows a perspective view of a linkage member of the motor device of FIG. 1,
  FIG. 4 shows a perspective view of a closing plate of the motor device of FIG. 1,
  FIG. 5 shows a sectional side view of the motor device of FIG. 1,
  FIG. 6 shows a side view of a support of the motor device of FIG. 1, and
  FIG. 7 shows a partial exploded view of the motor device of FIG. 1, with the closing plate positioned directly above the support.

In these figures, elements which are identical or similar bear the same reference numerals.

The following embodiments are examples. Whilst the description refers to one or more embodiments, this does not necessarily mean that each reference relates to the same embodiment or that the features apply solely to a single embodiment. Single features of different embodiments may also be combined to produce further embodiments.

With reference to FIG. 1, a windscreen wiper drive motor device 1 for a motor vehicle has been shown, in particular, for a rear window windscreen wiper.

The motor device 1 comprises a housing formed from a support 2 (FIG. 6) and a closing plate 3 (FIG. 4) closing the support 2. The closing plate 3 is fixed to the support 2, for example by means of fixing screws 4. The housing accommodates the elements of the motor device 1, in particular a shaft 5, a toothed wheel 8 and a linkage member 9.

It is more clearly visible in FIG. 2 that the support 2 receives the shaft 5 (or armature shaft) bearing an endless screw 6. The shaft 5 protrudes from the rotor of an electric motor protected by a cap 23. The support 2 also receives the toothed wheel 8, which meshes with the endless screw 6, in addition to the linkage member 9 of the motor device 1.

The linkage member 9 (FIG. 3) is a connecting rod system having an input shaft 10 and an output shaft 11 which are articulated. The input shaft 10 is mounted in an eccentric cavity 12 of the toothed wheel 8 and the output shaft 11 is mounted in a hollow shaft 13 protruding from a base 14 of the closing plate 3 (FIG. 4). The hollow shaft 13 is designed to pass through the bodywork of the vehicle for the passage of the output shaft 11 driving the windscreen wiper arm. Once mounted in the vehicle, the hollow shaft 13 extends vertically.

The base 14 of the closing plate 3 which closes the support 2 is generally plate-shaped. The closing plate 3 also comprises a fixing device such as fastening clips 15, for example three, connected to the base 14, to fix the motor device 1 to the motor vehicle (FIG. 1).

As may be seen in the sectional view of FIG. 5 and in FIG. 6, the motor device 1 comprises a rolling bearing 16 to support the shaft 5 bearing the endless screw 6. The rolling bearing 16 is arranged, for example, substantially in the middle of the shaft 5, between the rotor of the motor 7 and the endless screw 6. The rolling bearing 16 may be arranged in a rolling bearing mounting 22 of the support 2 designed to be connected to the cap 23 of the motor 7. The rolling bearing 16 is thus arranged at the output of the motor 7.

A bush mounting 17 is also formed in the support 2 to receive one end of the shaft 5 bearing the endless screw 6. The bush mounting 17 has a cylindrical shape which is coaxial to the axis of rotation of the shaft 5. The motor device 1 also comprises a cylindrical bush 18, received in the bush mounting 17 and supporting the end 5a of the shaft 5.

As may be seen in FIGS. 5 and 7, an orifice 19 is formed in the axial end of the bush mounting 17, on the outer face of the support 2, in the axis of rotation of the shaft 5. The bush mounting 17 thus has a through hole. The orifice 19 permits the introduction of a tool for shaping the bush 18 during the assembly of the elements of the motor device 1.

The closing plate 3 further comprises a closing tongue 20 which is made of the same material as the base 14 and serves as a water deflector for the orifice 19 (FIGS. 1, 4, 5, 7). The closing tongue 20 thus prevents the orifice 19 of the bush mounting 17 from forming a point of entry for water droplets originating, in particular, from the flows along the hollow shaft 13 of the closing plate 3.

The protection of the orifice 19 by the closing plate 3 is simple to implement since it is carried out at the same time as the closure of the support 2 by positioning the closing plate 3. Creating and resorting to additional parts, such as a threaded closing screw as well as the machining of the support, such as thread tapping, are thus avoided, which simplifies the assembly method and limits the costs.

The closing tongue 20 is capable, for example, of closing the orifice 19, by covering said orifice, thus sealing externally the access to the bush mounting 17. The closure of the orifice 19 of the bush mounting 17 by the closing tongue 20 reinforces the protection of the housing by permitting, in particular, the penetration of moisture or dirt to be avoided and also improves its visual appearance.

According to one exemplary embodiment, the closing tongue 20 extends substantially perpendicular to the base 14. The closing tongue 20 may have a planar surface so as to be pressed against the planar surfaces of the support 2 around the orifice 19, may be seen in FIG. 5, the end 5a of the shaft 5 is not positioned in abutment against the closing tongue 20. A gap exists therebetween.

The closing tongue 20 has, for example, a rounded end, for example as a filled U-shape, providing it with a strong shape.

Moreover, according to one exemplary embodiment, the closing plate 3 comprises at least one reinforcement 21 which is at least partially borne by the closing tongue 20 and which is made of the same material as the closing tongue 20.

The reinforcement 21 has, for example, a rib shape extending perpendicular to the planar surface of the closing tongue 20.

The reinforcement 21 permits the mechanical strength of the closing tongue 20 to be reinforced, in particular to prevent it from being twisted or broken before the closing plate 3 is mounted on the support 2.

The reinforcement 21 extends, for example, on the periphery of the closing tongue 20. In the case of a closing tongue 20 having a planar surface and a rounded end as a filled U-shape, the reinforcement 21 thus extends along the rounded periphery.

The reinforcement 21 may also extend over the base 14. Thus, in the example, the reinforcement 21 is extended by two ribs located on each side of the closing tongue 20 on the base 14 (FIG. 4).

The closing plate 3 is, for example, made from plastics material and is obtained in one piece by moulding.

The invention claimed is:

1. A closing plate for a windscreen wiper drive motor device for a motor vehicle, comprising:
    a support;
    a shaft being received therein, said shaft bearing an endless screw which is configured to be driven in rotation by a motor,
        wherein said support comprises a bush mounting for receiving a bush for supporting one end of the shaft;
    a base for closing said support; and
    a closing tongue made of the same material as the base and serves as a water deflector for an orifice formed in the end of the bush mounting in the axis of rotation of the shaft.

2. The closing plate according to claim 1, wherein the closing tongue is capable of closing the orifice of the bush mounting.

3. The closing plate according to claim 2, wherein the closing tongue extends substantially perpendicular to the base.

4. The closing plate according to claim 1, wherein the closing tongue has a planar surface.

5. The closing plate according to claim 1, further comprising at least one reinforcement which is at least partially borne by the closing tongue and which is made from the same material as the closing tongue.

6. The closing plate according to claim 5, wherein the reinforcement extends over the periphery of the closing tongue.

7. The closing plate according to claim 5, wherein the reinforcement also extends over the base.

8. The closing plate according to claim 1, wherein the closing tongue has a rounded end.

9. The closing plate according to claim 1, wherein the closing tongue has a filled U-shape.

10. The closing plate according to claim 1, wherein it is obtained by moulding.

11. The windscreen wiper drive motor device for the motor vehicle according to claim 1, comprising:
   said support;
   said shaft being received therein, said shaft bearing said endless screw configured to be driven in rotation by a motor of said device,
      the support comprising said bush mounting for receiving said bush, said bush supporting one end of the shaft bearing the endless screw, said orifice being formed in the end of the bush mounting in the axis of rotation of the shaft; and
   said closing plate closing the support and serving as a water deflector for the orifice of the bush mounting.

12. The motor device according to claim 11, further comprising a rolling bearing to support the shaft bearing the endless screw.

13. The motor device according to claim 12, wherein the rolling bearing is arranged in the rolling bearing housing of the support, designed to be connected to a housing of the motor.

\* \* \* \* \*